May 24, 1966  K. W. STELLRECHT ETAL  3,252,393
FLASH GUN FOR UNDERWATER CAMERA
Filed Jan. 6, 1964
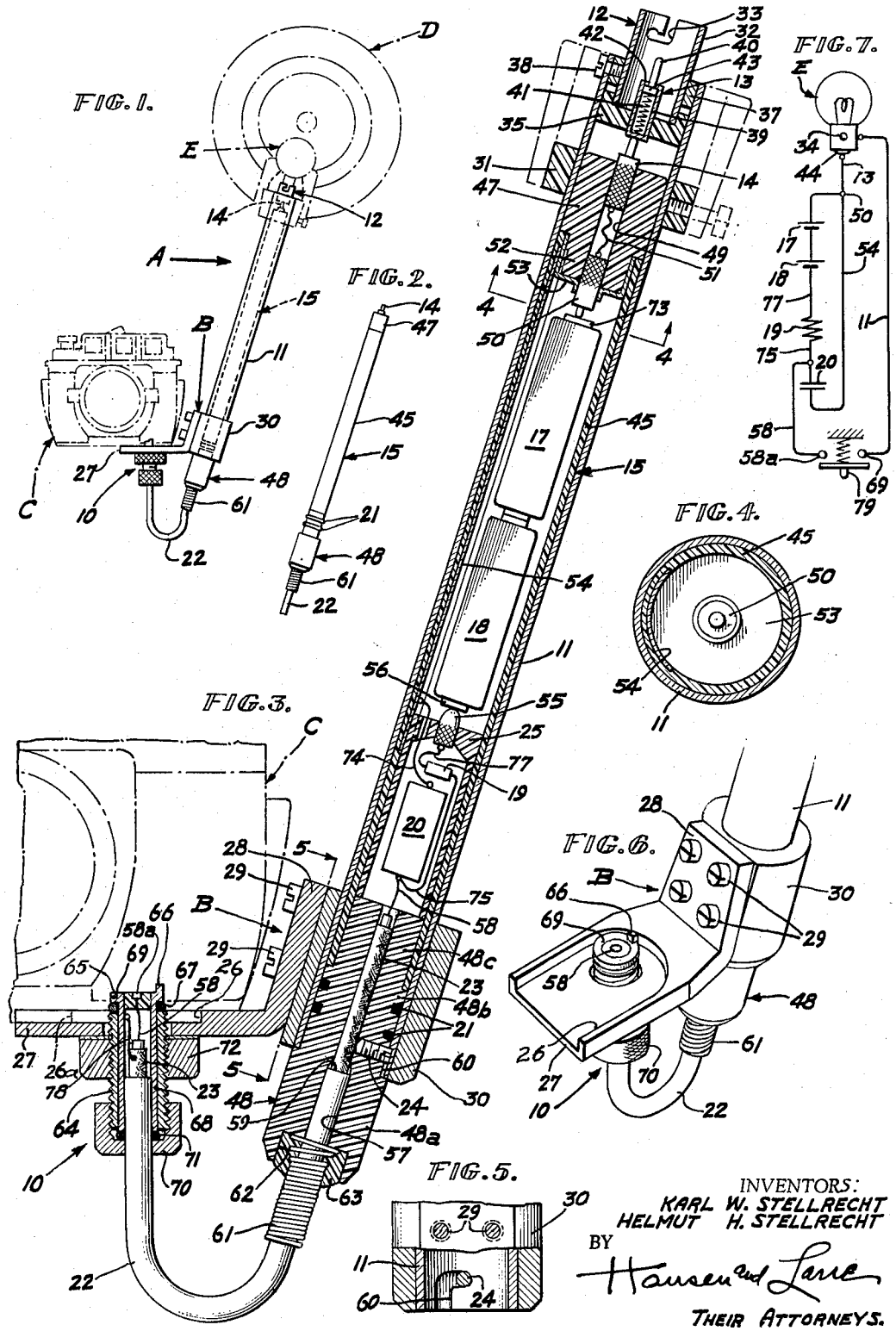
INVENTORS:
KARL W. STELLRECHT
HELMUT H. STELLRECHT
BY
Hansen and Larre
THEIR ATTORNEYS.

United States Patent Office 3,252,393
Patented May 24, 1966

1

3,252,393
FLASH GUN FOR UNDERWATER CAMERA
Karl W. Stellrecht and Helmut H. Stellrecht, both of
2553 Malone Place, Santa Clara, Calif.
Filed Jan. 6, 1964, Ser. No. 335,909
5 Claims. (Cl. 95—11)

The present invention relates to a camera flash gun, and pertains more particularly to a flash gun for underwater use.

For underwater photography it is of course necessary to have the camera which is used completely sealed against the entrance of water. In the past, numerous water-tight enclosures have been provided to adapt ordinary cameras for this purpose, and recently there has been marketed a camera, the housing of which is completely sealed, and which may be used for underwater photography without any protective enclosure whatsoever.

The present invention provides a flash gun which can be used for underwater photography in the same general manner as a flash gun is used on an ordinary camera above water, and wherein an inner housing containing batteries and other components is completely sealed against the entrance of water for underwater work, but can be easily withdrawn and disassembled for the replacement of batteries or the repair or replacement of other components.

Another object of the invention is to provide a flash gun for underwater photography comprising a tubular metal casing with a flash lamp socket sealed in one end thereof, a combined battery and component housing being inserted co-axially in the other end of the casing and sealed thereto, a conductor cable being sealed to the housing to project through the opposite end thereof from the lamp socket, means also being provided for sealing the conductor cable in a recess provided therefor in a water-proof camera housing.

A further object of the invention is to provide an improved and simplified flash gun for use in underwater photography.

These, and other objects and advantages of the invention, will be apparent from the following description and the accompanying drawings, wherein:

FIG. 1 is a small scale, front elevational view of an underwater camera having a flash gun embodying the present invention mounted thereon, the position of the axially inserted housing being indicated in broken lines, the camera and a reflector being shown in dot-dash lines.

FIG. 2 is a side elevational view of a battery and component housing as it appears when withdrawn from the tubular metal casing, a portion of the conductor cord being omitted.

FIG. 3 is an enlarged, longitudinal, diametrical, sectional view through the assembly shown in FIG. 1, the reflector being removed, and portions of the camera being broken away.

FIG. 4 is a further enlarged, transverse sectional view taken along line 4—4 of FIG. 3.

FIG. 5 is a similarly enlarged, fragmentary, sectional view taken along line 5—5 of FIG. 3, portions being broken away to show the bayonet-latch for retaining the housing in the casing.

FIG. 6 is a fragmentary, perspective view of the lower end portion of the flash gun mechanism of FIGS. 1–5 as it appears when removed from the camera housing.

FIG. 7 is a diagram of the circuit employed in the flash gun shown in FIGS. 1–6.

Briefly, the invention comprises a flash gun A having a mounting bracket B thereon. The latter is adapted to be attached by a contact assembly 10 to the housing C of an underwater camera. Throughout the present description of the invention, the various parts will be described in their position of FIGS. 1–3, 5 and 6.

In the illustrative flash gun A a tubular metal casing 11 has the mounting bracket B fixedly secured to its lower end, and a flash lamp socket 12 sealed co-axially in its upper end. The central contact member 13 of the socket 12 is exposed interiorly of the casing 11 for engagement by a spring contact member 14 mounted co-axially of the upper end of an insulative battery and component housing 15, having two electric batteries 17 and 18, a resistor 19 and a capacitor 20 mounted therein.

The housing 15 is of a size to fit freely into the lower end of the casing 11, and a pair of conventional O-rings 21 seal the housing 15 to the casing 11. An insulated conductor cord 22 is inserted axially through the lower end of the housing 15, and a portion of the outer insulative cover of this cord is stripped to expose an inner metallic sheathing 23 which provides an electrically conductive path through a bayonet-latch screw 24 to the casing 11. The resistor 19 and capacitor 20 are mounted in a separate compartment 25 provided therefor within the housing 15, and are connected into a charging and firing circuit by conductors as described later herein.

Referring to the drawings in greater detail, the angular mounting bracket B has one leg 27 thereof formed to fit onto the under side of the camera housing C. The bracket leg 27 has a recess 26 in its upper side to receive a boss 26a on the under side of the camera housing. The other leg 28 of the bracket 27 extends upwardly and outwardly and is secured by screws 29 to a flat face formed on a side of a thick walled tubular collar 30 secured on the lower end of the metal casing 11. A collar 31 is also secured on the casing 11 for mounting a conventional reflector D in a usual manner thereon. The bracket B, collars 30 and 31, casing 11, and screws 29 preferably are all of black, anodized aluminum.

The lamp socket 12 comprises a conventional socket shell 32 with a usual bayonet notch 33 therein to receive the pin 34 (FIG. 7) conventionally provided on photographic flash lamps E (FIG. 7) for releasably retaining them in a socket. The socket base 35 preferably is of suitable, strong, insulative material, such as a baked phenolic condensation product of the type known as Bakelite, and is of a size to fit snugly into the upper end of the casing 11. A bushing 37 is fitted into the space between the socket shell 32 and the casing 11 above the socket base 35, and is sealed to the casing and to the socket shell with a suitable sealant, not shown. A screw 38 is screwed into registering holes in the casing 11 and the bushing 37, and bears against the side of the socket shell 32 to insure against movement of the parts, and to provide an electrically conductive path from the casing to the socket shell.

The central socket contact 13 comprises a cup-shaped shell 39 of suitable corrosion resistant metal such as bronze, with a spring-pressed plunger 40 mounted for limited axial movement therein. A coil spring 41 is held in compression between the bottom of the shell 39 and the plunger 40. The upper end of the shell 39 is curled inwardly at 42 to overlie and retain the enlarged head portion 43 of the plunger 40, and at the same time to permit the shank of the plunger to move freely, axially therein. The shell 39 is molded in position axially of the socket base portion 35 with the upper end of its plunger 40 positioned for biased engagement with the central contact 44 (FIG. 7) of a conventional flash lamp E when the latter is inserted in the socket 12. The lower end of the central socket contact member 13 is exposed interiorly of the casing 11 for engagement by the end contact member 14 of the inner housing 15.

The latter comprises a central, tubular member 45, and end plugs 47 and 48, all three of which preferably are of clear, strong, plastic material, such as, for example, Lucite. The upper end plug 47 is of a diameter to fit freely into the casing 11, as is also the housing tube 45. An axial hole 49 is provided in the upper plug 47, into which are fitted the upper housing contact member 14 and a lower contact member 50. These contact members 14 and 50 may be similar to the socket contact member 13 described previously herein. The contact members 14 and 50 are mounted with their respective spring-pressed plungers projecting from opposite ends of the plug 47, as illustrated in FIG. 3, and are secured against displacement in the hole 49 as by being coated with a suitable adhesive before insertion therein. The shells of the contact members 14 and 50 are electrically connected to each other by a conductor 51.

A reduced end portion 52 is provided on the lower end of the upper plug 47, and this reduced portion is capped by a metal cap 53, which is in electrical contact with the contact member 50. The metal cap 53 preferably is secured to the reduced end portion 52 of the plug 47 as by a suitable adhesive, not shown, and is of a size to fit into the housing tube 45 so as to frictionally retain the plug 47 in the tube during ordinary handling, but to permit the plug 47 to be withdrawn when required for replacing the batteries 17 and 18, or other servicing when required.

A conductor strip 54 is fitted along the interior of the tube 45 to have electrical contact with the cap 53. This strip preferably is of thin, electrically conductive metal, such as shim brass or heavy brass or aluminum foil, and is secured in place as by a suitable adhesive, not shown.

The inner compartment 25 for containing the resistor 19 and capacitor 20 is made by drilling an axial recess in a length of plastic rod of a diameter to fit snugly, but removably, within the housing tube 45. A fixed contact member 55 is secured in a hole provided therefor axially of the otherwise closed end of the inner compartment 25 for contacting the bottom terminal 56 of the lower battery 18.

The lower end plug 48 has a lower portion 48a of a diameter larger than the casing 11 so as to limit the insertion of the plug 48, and thereby of the entire housing 15, into the casing 11. The plug 48 also has a reduced intermediate portion 48b of a size to fit snugly, but slidably, into the lower end of the casing 11, and a reduced upper end portion 48c of a size to fit snugly into the lower end of the housing tube 45. The pair of O-rings 21, mentioned previously herein, are fitted into annular grooves provided therefor around the intermediate plug portion 48b for sealing the space between the plug 48 and the casing 11.

An axial hole 57 is provided through the plug 48 for receiving the conductor cord 22 therein. The illustrated conductor cord 22 comprises a central conductor 58, enclosed by an inner layer of insulation, such as rubber. This inner insulation is enclosed by the woven sheath 23 of electrically conductive metal, such as copper, and the sheath in turn is enclosed in an outer layer 59 of flexible, insulative material, such as rubber or neoprene. An end portion of this outer insulative layer is stripped away as shown in (FIG. 3) to expose the woven sheath 23. The hole 57 for the conductor cord 22 has the lower portion thereof of a size to snugly receive the entire conductor cord 22 therein, while the diameter of the upper end portion of this hole is reduced to fit the portion of the conductor cord from which the outer layer has been removed.

Electrical connection between the woven sheath 23 and the casing 11 is provided by the screw 24 of electrically conductive metal, such as aluminum alloy. This screw is screwed into a threaded hole provided therefor radially of the plug 48 below the O-rings 21. The inner end of this screw 24 engages the woven metal sheath 23, while the outer end thereof projects slightly from the plug 48 and fits into a bayonet notch 60 provided therefor in the lower end of the casing 11.

In inserting the conductor cord 22 into its axial hole 57 in the plug 48, the portion of the cord which is to be within the lower end of the hole 57 is coated with a suitable sealant, not shown, so as to seal the space between the cord and the plug. Also, to avoid sharply bending the cord 22 at its zone of emergence from the plug 48, a coil spring 61 surrounds the cord 22 for a few inches and is provided with a few turns of larger diameter at its upper end which are fitted into a recess 62 provided therefor around the lower end of the axial hole 57. These enlarged turns of the spring 61 are fixedly secured in the recess 62 by being embedded in a suitable material 63, such as epoxy resin.

The camera contact assembly 10 on the camera end of the conductor cord 22 provides for sealing the cord 22 to the camera housing C, and also for attaching the mounting bracket B to the camera housing. This contact assembly 10 comprises an externally threaded sleeve 64 which screws into a similarly threaded recess 65 in the camera housing C. The camera housing recess 65 has an unthreaded portion at its upper or inner end to permit an O-ring 67 mounted on the upper end of an inner metal sleeve 68 to seat in sealing relation therein. The conductor cord 22 is fitted snugly into the inner sleeve 68 and is sealed thereto. An annular flange 69 is provided around the upper end of the inner sleeve 68 of a diameter to fit slidably into the unthreaded upper end portion of the camera recess 65 above the O-ring 67, and an endwise extending lug 66 is provided on the flange 69 to fit into a correspondingly shaped portion of the recess 65 to prevent rotation of the inner sleeve 68. When the threaded sleeve 64 is screwed into the recess 65, it compresses the O-ring 67 between the upper end of the threaded sleeve 64 and the sleeve flange 69 to seal the space between the inner sleeve 68 and the side of the recess 65. A terminal 58a on the end of the central conductor 58 of the cord 22 is set in a suitable insulative matrix centrally of the upper end of the inner sleeve 68.

An internally threaded ring nut 70 is screwed onto the lower end of the threaded sleeve 64, and compresses an O-ring 71 into sealing engagement between the conductor cord 22 and the end of the tthreaded sleeve 64 when the ring nut is screwed down onto the threaded sleeve. A bracket engaging nut 72 is also screwed onto the threaded sleeve 64, and after the latter has been screwed snugly into the camera recess 65 by means of the ring nut 70, the nut 72 is screwed down on the sleeve 64 to draw the flash gun bracket B tightly against the camera housing C. For removing the camera contact assembly 10 from the camera, the nut 72 is first screwed outwardly to engage the ring nut 70, whereupon further turning of the nut 72 in the same direction unscrews the threaded sleeve 64 from its recess 65.

While the drawings show the flash gun A mounted on a waterproof camera, it will be apparent to those familiar with the art that the invention may be used on other types of cameras having well known types of sealed enclosures for adapting them to underwater use, in which case the camera contact assembly may be readily modified as may be required to fit such other enclosure by any ordinarily skilled camera technician or engineer.

The electrical circuit for the illustrated form of the invention is shown diagrammatically in FIG. 7, wherein the reference numerals employed are those of the principal parts and conductors shown in FIGS. 3, 4 and 6. The circuit may, however, be followed in its entirety in FIG. 3.

The capacitor charging circuit is as follows: From the upper contact 73 of the upper battery 17, a conductive path is provided through the spring contact member 50, metal cap 53, conductor strip 54 and a conductor 74 to one terminal of the capacitor 20. From the other terminal of the capacitor 20 a conductor 75 leads to one terminal of the resistor 19, while from the other terminal of this resistor a conductor 77 leads to the fixed contact member 55, which is in contact with the lower terminal 56 of the lower battery 18. Through this circuit the batteries 17 and 18 constantly maintain the capacitor 20 in charged condition.

The firing circuit is as follows: From the lamp socket shell 32, through the electrically conductive casing 11, the bayonet-latch screw 24, the woven sheath 23 and a conductor 78 to the inner sleeve 68 of the camera contact assembly 10. The end flange 69 of the sleeve 68 is electrically connected to one terminal of the usual camera synchronizing switch indicated diagrammatically at 79 in FIG. 7. From the other side of this synchronizing switch 79, the firing circuit extends through the conductor terminal 58a, the central conductor 58 of the conductor cord 22 to one terminal of the constantly charged capacitor 22. Thence the firing circuit is completed from the other terminal of the capacitor through the conductor 74, the electrically conductive strip 54, the metal cap 53, the spring contact 50, the conductor 51 and the contact 14 to the central socket contact 13 to fire a flash lamp E, FIG. 7, mounted in the socket 12.

In using the illustrated form the invention, assuming that the battery and component housing 15 is assembled and inserted in the casing 11 as shown in FIGS. 1 and 3, the flash gun A is mounted on a camera housing C by screwing the threaded sleeve 64 snugly into a camera housing recess 65 by means of the ring nut 70, and then screwing the nut 72 down firmly clamp the bracket B to the camera housing. This action also causes the ring nut 70 to bear firmly on the O-ring 71 to seal the space between the threaded sleeve 64 and the conductor cord 22. A conventional flash lamp E is then inserted in the socket 12 and the device is ready to use. Although when immersed in salt water the water provides a slightly conductive path tending to short-circuit the lamp socket shell 32 to the central socket contact 13, there is sufficient resistance in this conductive path so that when the capacitor 20 is discharged through the firing circuit as explained previously herein reliable performance is assured.

To replace the batteries 17 and 18 when required, with the mechanism out of water, and after removing the the camera contact assembly 10 and the bracket B from the camera housing C by unscrewing the threaded sleeve 64 from its recess by means of the nut 72, the battery and component housing 15 is withdrawn axially from the casing 11 by grasping the projecting lower end portion 48a of the lower plug 48, turning the housing 15 sufficiently to release the bayonet-latch screw 24 from the transverse portion of its notch 60, and then pulling the housing 15 axially free of the casing 11. The upper housing plug 47 may then be withdrawn from the tube 45 and the remaining portion of the housing inverted to cause the batteries 17 and 18 to gravitate therefrom. New batteries may then be inserted, the upper plug 47 replaced, and the housing 15 reinserted fully into the casing 11 and relatched therein by means of the bayonet-latch screw 24. The bracket B and camera contact assembly 10 may then be re-mounted on the camera housing C as shown in FIGS. 1 and 3, and as described previously herein, and the flash gun A is again ready for use.

The invention provides a simple, inexpensive, and highly effective flash gun for underwater photography. It is securely sealed, and no more cumbersome or difficult to operate and service than conventional flash guns intended for above water photography. It can also be used as readily for general photography as an ordinary above-water flash gun, and is highly desirable for such use in damp, rainy or tropical conditions.

While we have illustrated and described a preferred embodiment of the present invention, it will be understood, however, that various changes and modifications may be made in the details thereof without departing from the scope of the invention as set forth in the appended claims.

Having thus described the invention, what we claim as new and desire to protect by Letters Patent is defined in the following claims:

1. A flash gun for underwater photography comprising:
   (a) a tubular metal casing,
   (b) a bracket for mounting the casing on the housing of an underwater camera,
   (c) a flash lamp socket pressure sealed in one end of the casing and pressure sealing said one end of the casing, one contact of the socket being electrically connected to the casing, and the other contact thereof being exposed interiorly of the casing,
   (d) a removable inner housing of insulative material of a size to fit slidably into the opposite end of the casing from that in which the lamp socket is mounted, and enclosing a battery, a resistor and a capacitor therein,
   (e) a contact member on the inner end of the inner housing positioned to contact the interiorly exposed socket contact member when the housing is inserted fully into the casing,
   (f) stop means for limiting the insertion of the inner housing to such fully inserted condition,
   (g) O-rings fitted into annular grooves provided therefor around the inner housing inwardly of the stop means for sealing the inner housing to the casing, the portion of the inner housing exteriorly beyond the O-rings being pressure sealed,
   (h) a two-conductor cord extending in sealed relation through the housing exteriorily of said O-rings for connection to the synchronizing switch mechanism of an underwater camera with which the flash gun is to be used, and
   (i) circuit conductors connecting the battery and resistor in series with the capacitor to charge the capacitor, and to connect the capacitor through the conductor cord and the synchronizing switch to the socket contacts upon closing the synchronizing switch to fire a flash lamp inserted in the socket.

2. A flash gun for underwater photography comprising:
   (a) a tubular metal casing,
   (b) a flash lamp socket pressure sealed in one end of the casing and pressure sealing one end of the casing, one contact of the socket being electrically connected to the casing, and the other contact thereof being exposed interiorly of the casing,
   (c) a removable inner housing of a size to fit slidably into the opposite end of the casing from that in which the lamp socket is mounted, and enclosing a battery, a resistor and a capacitor therein,
   (d) the inner housing being of insulative material and comprising a tubular central portion and an end plug fitted into each end of the tubular portion,
   (e) spring contact means extending through one of the plugs for contact with the interiorly exposed socket contact and with a battery enclosed within the inner housing,
   (f) O-rings fitted into annular grooves provided therefor around the other plug for sealing the inner housing to the casing,
   (g) a two-conductor cord extending in pressure sealed relation through said other plug beyond the O-rings for connection to the synchronizing switch mechanism of an underwater camera with which the flash gun is to be used, and
   (h) circuit conductors connecting the battery and resistor in series with the capacitor to charge the capacitor, and to connect the capacitor through the conductor cord and the synchronizing switch to the socket contacts upon closing the synchronizing switch to fire a flash lamp inserted in the socket.

3. A flash gun for underwater photography comprising:
   (a) a tubular metal casing,
   (b) a flash lamp socket pressure sealed in one end of the casing and pressure sealing said one end of the casing, one contact of the socket being electrically connected to the casing, and the other contact thereof being exposed interiorly of the casing,
(c) a removable inner housing of a size to fit slidably into the opposite end of the casing from that in which the lamp socket is mounted, and enclosing a battery, a resistor and a capacitor therein,
(d) the inner housing being of electrically insulative material and comprising a tubular central portion and an end plug fitted into each end of the tubular portion,
(e) spring contact means extending through one of the plugs for contact with the interiorly exposed socket contact and with one end of a battery enclosed within the housing
(f) means forming a pressure sealed inner compartment within the housing and housing the resistor and capacitor therein,
(g) O-rings fitted into annular grooves provided therefor around the other plug for sealing the inner housing to the casing,
(h) a two-conductor cord extending in sealed relation through said other plug for connection to the synchronizing switch mechanism of a camera with which the flash gun is to be used, and
(i) circuit conductors connecting the battery and resistor in series with the capacitor to charge the capacitor, and to connect the capacitor through the conductor cord and the synchronizing switch to the socket contacts upon closing the synchronizing switch to fire a flash lamp inserted in the socket.

4. An arrangement according to claim 3 wherein the means forming the inner compartment comprises a tubular enclosure fitted into the tubular portion of the housing at the end thereof opposite that having the spring contact means therein, said tubular enclosure being closed on the end thereof which is directed toward the end of the housing having the spring contact means therein, and a contact member embedded in the closed end of the tubular enclosure for contacting the other end of a battery from that engaged by said spring contact means.

5. An arrangement according to claim 3 wherein a strip of electrically conductive sheet material is affixed to the interior of the housing central tubular portion to extend lengthwise therein, and an electrically conductive cap is fitted over the inner end of the plug having the spring contact therein, said cap being in electrical contact with said spring contact, the cap having wiping electrical contacting engagement with the metal strip upon insertion of the capped end of the plug into the housing tubular portion for providing an electrically conductive path from the spring contact lengthwise within the housing.

References Cited by the Examiner

UNITED STATES PATENTS 2,872,622  2/1959  Edgerton _____ 95—11.5 X
3,162,376  12/1964  Furuya _____ 240—261

OTHER REFERENCES

"Journal of the Society of Motion Picture and Television Engineers," July 1955, vol. 64, No. 7, pages 348 and 349 relied upon.

JOHN M. HORAN, *Primary Examiner.*